Patented Mar. 10, 1953

2,631,174

UNITED STATES PATENT OFFICE 2,631,174

PRODUCTION OF POLYCYCLIC BENZENE HYDROCARBONS

Vladimir N. Ipatieff and Herman Pines, Chicago, Ill., assignor to Universal Oil Products Company, Chicago, Ill., a corporation of Delaware No Drawing. Application October 2, 1950, Serial No. 188,070

20 Claims. (Cl. 260—668)

This application is a continuation-in-part of our co-pending application Serial Number 788,644 (now Patent No. 2,526,897) filed November 28, 1947, as a continuation-in-part of our application Serial Number 619,430 which was filed September 29, 1945, and now abandoned.

This invention relates to a process for producing a polycyclic hydrocarbon containing two benzene rings and two cycloalkane rings, the latter being preferably cyclohexane rings.

An object of this invention is to condense two molecular proportions of a cycloalkylbenzene hydrocarbon to form a polycyclic hydrocarbon containing two benzene rings and two cycloalkane rings.

Another object of this invention is to produce a polycyclic benzene hydrocarbon which is useful as an intermediate in the synthesis of dyes, medicinals, insecticides, etc.

Another object of this invention is the production of 1-p-tolyl-1-(2-methyl-5-cyclohexylphenyl) cyclohexane.

One embodiment of this invention relates to a process for producing a polycyclic hydrocarbon containing two benzene rings and two cycloalkane rings which comprises reacting at hydrogen transfer conditions in the presence of an acid-acting catalyst a branched-chain olefin-acting compound and a p-disubstituted benzene hydrocarbon having as one substituent a cycloparaffin ring containing only one hydrogen atom joined to the carbon atom combined with the benzene ring and having a second substituent in para position to the first substituent and selected from the class consisting of a methyl group, a cyclopentyl group, and a cyclohexyl group.

Another embodiment of this invention relates to a process for producing a polycyclic hydrocarbon containing two benzene rings and two cyclohexane rings which comprises reacting at hydrogen transfer conditions in the presence of an acid-acting catalyst a branched-chain olefin-acting compound and a p-disubstituted benzene hydrocarbon having as one substituent a cyclohexane ring containing only one hydrogen atom joined to the carbon atom combined with the benzene ring and having a second substituent in para position to the first substituent and selected from the class consisting of a methyl group and a cyclohexyl group.

A further embodiment of this invention relates to a process for producing a polycyclic hydrocarbon containing two benzene rings and two cyclohexane rings which comprises reacting at hydrogen transfer conditions in the presence of an acid-acting catalyst a branched-chain olefin-acting compound and a para-di-substituted benzene hydrocarbon having as one substituent a cyclohexane ring containing only one hydrogen atom joined to the carbon atom combined with the benzene ring and having a methyl group in para position to said cyclohexyl group.

A still further embodiment of this invention relates to a process for producing a polycyclic hydrocarbon containing two benzene rings and two cyclohexane rings which comprises reacting at hydrogen transfer conditions in the presence of an acid-acting catalyst a branched-chain olefin-acting compound and a para-di-substituted benzene hydrocaron having as one substituent a cyclohexane ring containing only one hydrogen atom joined to the carbon atom combined with the benzene ring and having a second cyclohexyl group in para position to the first cyclohexyl group.

An additional embodiment of this invention relates to a process for producing 1-p-tolyl-1-(2 - methyl - 5 - cyclohexylphenyl) cyclohexane which comprises reacting at hydrogen transfer conditions in the presence of an acid-acting catalyst a methylcyclohexene and para-methylcyclohexylbenzene and recovering the resultant reaction product containing 1 - p - tolyl - 1 - (2-methyl-5-cyclohexylphenyl) cyclohexane.

We have developed a method for producing polycyclic hydrocarbons containing two benzene rings and two cycloparaffin rings by effecting a reaction at hydrogen transfer conditions between a branched-chain olefin-acting compound and an aromatic hydrocarbon containing a methyl group and a cycloalkyl group as a cyclopentyl or cyclohexyl group in para positions or containing a cyclohexyl group and a cycloalkyl group, the latter being preferably a cyclopentyl or a cyclohexyl group, in para positions to each other. Thus one of said para substituents contains a hydrogen atom combined with the carbon atom that is joined to the aromatic ring. This carbon atom and nuclear carbon atoms of the benzene ring undergo hydrogen transfer reactions with branched-chain olefin-acting compounds, particularly with branched-chain olefins in the presence of acid-acting catalysts to form condensation products of the para-disubstituted hydrocarbons which may be regarded as essentially dimers of the para-disubstituted benzene hydrocarbons charged to the process, except that the condensation product contains two less hydrogen atoms than present in two molecular proportions of the starting material.

The benzene hydrocarbons which may thus be used as a starting material in this process are represented by the general formula:

wherein $R^1$ represents a member of the class consisting of a methyl group and a cyclohexyl group as $R^2$ represents a cycloalkyl group preferably a cyclopentyl or a cyclohexyl group. These compounds which thus include para-methylcyclohexylbenzene and para-dicyclohexylbenzene each contain a carbon atom bound to the benzene ring which is also combined with only one hydrogen atom.

Olefinic starting materials suitable for this hydrogen transfer process have branched chains and include such hydrocarbons as trimethylethylene, dihydrolimonene, methyl cyclohexene, 1,1,3-trimethylcyclohexene, menthene, etc. The exact type of olefin to be used is dependent on the catalyst and the aromatic hydrocarbon with which the hydrogen transfer is to be effected. Thus n-octene and cyclohexene, namely, olefins not possessing branched chain, when reacted with a para-disubstituted aromatic at operating conditions similar to those used with the branched-chain olefins, effect alkylation but not hydrogen transfer.

In addition to the branched-chain monoolefins mentioned above, other olefin-acting compounds which are also utilizable in this process comprise conjugated diolefins containing a tertiary carbon atom, alcohols, ethers, esters of carboxylic acids, and alkyl halides which may be regarded as capable of forming branched-chain olefins in situ in the reaction mixture.

The process as herein described is carried out in the presence of an acid-acting catalyst at conditions necessary for the hydrogen transfer reaction. Suitable acid-acting catalysts include mineral acids, such as sulfuric acid, chlorosulfonic acid, fluorosulfonic acid, hydrogen fluoride, hydroxy-borofluoric acids, fluorophosphoric acids, phosphoric acids; Friedel-Crafts halide catalysts, particularly aluminum chloride, aluminum bromide, ferric chloride, zirconium chloride, boron fluoride. Since in some cases Friedel-Crafts catalyts may cause an alkyl migration within the aromatic ring before the hydrogen transfer reaction occurs, it is sometimes advantageous to use Friedel-Crafts complexes, such as etherate, alcoholate, etc. for this reaction.

Phosphoric acid catalyst comprise orthophosphoric acid and also polyphosphoric acids such as pyrophosphoric acid, triphosphoric acid, and tetraphosphoric acid. Under certain conditions of operation various acid-acting, oxide-type catalysts may be used which include activated clays, silica-alumina composites, and other silica-containing materials which are generally utilizable as catalysts for hydrocarbon cracking.

The operating conditions used in the process are dependent upon the nature of the hydrocarbons being treated and also upon the catalysts employed. When utilizing strong mineral acids, such as hydrogen fluoride, sulfuric acid, fluorosulfonic acid, chlorosulfonic acid, and the like, and also Friedel-Crafts metal halides promoted by a hydrogen halide such as hydrogen chloride, the process is carried out at a temperature of from about $-30°$ to about $100°$ C. and at pressure up to about 100 atmospheres. However, in the presence of hydrogen fluoride, sulfuric acid, and aluminum chloride catalysts the preferred operating temperature is generally from about $0°$ to about $50°$ C., while in contact with ferric chloride catalyst the preferred operating temperature is from about $50°$ to about $100°$ C. Silica-alumina and other synthetic oxide catalysts and clays are generally used at a temperature of from about $200°$ to about $400°$ C. and at a superatmospheric pressure generally not in excess of about 100 atmospheres.

The hydrogen transfer and condensation reaction of this process may be illustrated further by the following equations which represent the condensation of two molecular proportions of para-methylcyclohexylbenzene to form a polycyclic hydrocarbon containing two benzene rings and two cyclohexane rings.

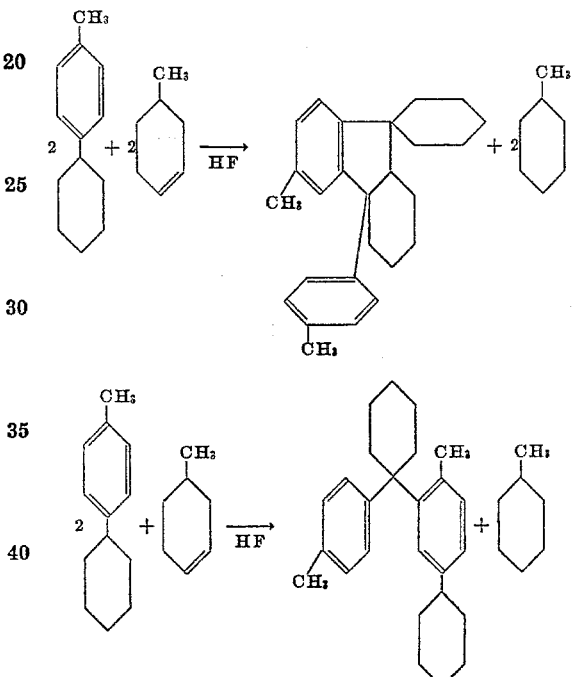

As indicated in the first equation, an indan-type compound is formed when the hydrogen transfer reaction involves the single hydrogen atom combined with the carbon atom that is bound to the aromatic ring of all of the para-methylcyclohexylbenzene involved in the reaction whereas as illustrated in Equation 2 a polysubstituted methane-type of compound is formed when the hydrogen transfer results in the combination of the carbon atom of the cyclohexane ring of one molecule of the p-methylcyclohexylbenzene with the benzene ring of another molecular proportion of p-methylcyclohexylbenzene.

This process is carried out in either batch or continuous type of operation. In batch-type operation the usual procedure consists in placing a mineral acid or Friedel-Crafts catalyst and a portion, generally about 50%, of the aromatic hydrocarbon in a reactor provided with a mechanically driven stirrer, cooling these materials to a temperature of from about $0°$ to about $10°$ C. and adding thereto with stirring, a solution of the olefin in the remainder of the aromatic hydrocarbon. The reaction mixture is then separated and the product is washed, dried, and distilled to separate therefrom the polycyclic hydrocarbon. Unconverted benzene hydrocarbons recovered in this distillation are utilizable in the further operation of the process.

The process is also carried out in a continuous manner by passing the p-disubstituted benzene hydrocarbon and branched-chain olefin or cycloolefinic hydrocarbon through a suitable reactor in which they are contacted in the presence of the catalyst, the latter either as a liquid or as a solid, depending upon the catalyst employed in the process. When using mineral acid catalysts such as sulfuric acid, chlorosulfonic acid, or hydrogen fluoride, this catalytic material is introduced continuously to the reactor which is provided with suitable mixing means and the resultant product is then separated into a hydrocarbon layer and a catalyst layer, the later being returned to further use in the process while the hydrocarbon layer is washed, dried, and distilled as hereinabove set forth. When a solid catalyst such as silica-alumina, clay, or a supported Friedel-Crafts type catalyst is used as a fixed bed in the reactor and the aromatic and cycloolefinic hydrocarbons are passed therethrough, the resultant hydrocarbon product requires no washing and drying treatment and may be subjected to distillation to separate therefrom unconverted aromatic and cycloolefinic hydrocarbons and to recover the desired polycyclic benzene hydrocarbons.

The polycyclic benzene hydrocarbons formed in this process and containing two benzene rings and two cycloparaffin rings such as are present in the indan-type hydrocarbon or in the 1-p-tolyl-1-(2 - methyl - 5 - cyclohexylphenyl) cyclohexane shown as a product in the second equation may be used as intermediates in the formation of dyes, medicinals, insecticides, and the like. Thus these polycyclic benzene hydrocarbons may be sulfonated and hydrolyzed to form phenols or they may be nitrated and reduced to produce the amines. The amines or anilines may be diazotized and converted into phenols which may be useful as inhibitors to prevent oxidative deterioration of organic compounds. The sulfonation product may also be used as a wetting agent.

The following example is given to illustrate results obtainable by the use of specific embodiments of the present invention although the example is given with no intention of restricting unduly the generally broad scope of the invention.

40 grams of p-methylcyclohexylbenzene and 19 grams of 3-methylcyclohexene are agitated with 75 grams of anhydrous hydrogen fluoride at a temperature of 10° C. during a time of two hours. The resultant hydrogen transfer product is separated into 15 grams of methylcyclohexane and 30 grams of polycyclic hydrocarbons comprising essentially 1-p-tolyl-1-(2-methyl-5-cyclohexylphenyl)-cyclohexane and an indan-type compound containing two cyclohexane rings and a benzene ring in addition to the indan nucleus.

We claim as our invention:

1. A process which comprises reacting at hydrogen transfer conditions in the presence of an acid-acting catalyst a branched-chain olefin-acting compound and a para-disubstituted benzene hydrocarbon having as one substituent a cyclo-paraffin ring containing only one hydrogen atom joined to the carbon atom combined with the benzene ring and having a second substituent in para position to the first substituent and selected from the class consisting of a methyl group, a cyclopentyl group, and a cyclohexyl group.

2. A process which comprises reacting at hydrogen transfer conditions in the presence of an acid-acting catalyst a branched-chain olefin-acting compound and a para-disubstituted benzene hydrocarbon having as one substituent a cyclohexane ring containing only one hydrogen atom joined to the carbon atom combined with the benzene ring and having a second substituent in para position to the first substituent and selected from the class consisting of a methyl group, a cyclopentyl group and a cyclohexyl group.

3. A process which comprises reacting at hydrogen transfer conditions in the presence of an acid-acting catalyst a branched-chain olefin-acting compound and a para-di-substituted benzene hydrocarbon having as one substituent a cyclohexane ring containing only one hydrogen atom joined to the carbon atom combined with the benzene ring and having a methyl group in para position to said cyclohexyl group.

4. A process which comprises reacting at hydrogen transfer conditions in the presence of an acid-acting catalyst a branched-chain olefin-acting compound and a para-disubstituted benzene hydrocarbon having as one substituent a cyclohexane ring containing only one hydrogen atom joined to the carbon atom combined with the benzene ring and having a second cyclohexyl group in para position to the first cyclohexyl group.

5. A process for producing 1-p-tolyl-1-(2-methyl-5-cyclohexylphenyl) cyclohexane which comprises reacting at hydrogen transfer conditions in the presence of an acid-acting catalyst a methylcyclohexene and para-methylcyclohexylbenzene and recovering the resultant reaction product containing 1 - p - tolyl - 1 - (2 - methyl-5-cyclohexylphenyl) cyclohexane.

6. A process which comprises reacting in the presence of a mineral acid catalyst at a temperature of from about —30° to about 100° C. a branched-chain olefin and a para-disubstituted benzene hydrocarbon having as one substituent a cyclohexane ring containing only one hydrogen atom joined to the carbon atom combined with the benzene ring and having a second substituent in para position to the first substituent and selected from the class consisting of a methyl group, a cyclopentyl group, and a cyclohexyl group.

7. A process which comprises reacting in the presence of a mineral acid catalyst at a temperature of from about —30° to about 100° C. a branched-chain olefin and a para-disubstituted benzene hydrocarbon having as one substituent a cyclohexane ring containing only one hydrogen atom joined to the carbon atom combined with the benzene ring and having a methyl group in para position to said cyclohexyl group.

8. A process which comprises reacting in the presence of a mineral acid catalyst at a temperature of from about —30° to about 100° C. a branched-chain alkene and a para-disubstituted benzene hydrocarbon having as one substituent a cyclohexane ring containing only one hydrogen atom joined to the carbon atom combined with the benzene ring and having a methyl group in para position to said cyclohexyl group.

9. A process which comprises reacting in the presence of a sulfuric acid catalyst at a temperature of from about 0° to about 50° C. a branched-chain olefin and a para-disubstituted benzene hydrocarbon having as one substituent a cyclohexane ring containing only one hydrogen atom joined to the carbon atom combined with the benzene ring and having a methyl group in para position to said cyclohexyl group.

10. A process which comprises reacting in the presence of a hydrogen fluoride catalyst at a temperature of from about 0° to about 50° C. a branched-chain olefin and a para-disubstituted benzene hydrocarbon having as one substituent a cyclohexane ring containing only one hydrogen atom joined to the carbon atom combined with the benzene ring and having a methyl group in para position to said cyclohexyl group.

11. A process which comprises reacting in the presence of a hydrogen fluoride catalyst at a temperature of from about 0° to about 50° C. a branched-chain alkene and a para-di-substituted benzene hydrocarbon having as one substituent a cyclohexane ring containing only one hydrogen atom joined to the carbon atom combined with the benzene ring and having a methyl group in para position to said cyclohexyl group.

12. A process which comprises reacting in the presence of a hydrogen fluoride catalyst at a temperature of from about 0° to about 50° C. an alkylcyclo-olefin and a para-disubstituted benzene hydrocarbon having as one substituent a cyclohexane ring containing only one hydrogen atom joined to the carbon atom combined with the benzene ring and having a methyl group in para position to said cyclohexyl group.

13. A process which comprises reacting a branched-chain olefin and para-methylcyclohexylbenzene at hydrogen transfer conditions in the presence of an acid-acting catalyst.

14. A process which comprises reacting a branched-chain olefin and para-methylcyclohexylbenzene in the presence of a mineral acid catalyst at a temperature of from about −30° to about 100° C.

15. A process which comprises reacting a branched-chain olefin and para-methylcyclohexylbenzene in the presence of a sulfuric acid catalyst at a temperature of from about 0° to about 50° C.

16. A process which comprises reacting a branched-chain olefin and para-methylcyclohexylbenzene in the presence of a hydrogen fluoride catalyst at a temperature of from about 0° to about 50° C.

17. A process which comprises reacting a branched-chain olefin and p-dicyclohexylbenzene in the presence of a mineral acid catalyst at a temperature of from about −30° to about 100° C.

18. A process which comprises reacting a branched-chain olefin and p-dicyclohexylbenzene in the presence of a sulfuric acid catalyst at a temperature of from about 0° to about 50° C.

19. A process which comprises reacting a branched-chain olefin and p-dicyclohexylbenzene in the presence of a hydrogen fluoride catalyst at a temperature of from about 0° to about 50° C.

20. 1-p-tolyl-1-(2-methyl-5-cyclohexylphenyl)-cyclohexane.

VLADIMIR N. IPATIEFF.
HERMAN PINES.

No references cited.